US011410092B2

(12) United States Patent
Silverstein et al.

(10) Patent No.: US 11,410,092 B2
(45) Date of Patent: Aug. 9, 2022

(54) DYNAMICALLY PREDICTING VENUE ACTIVITY BASED ON WEATHER DATA

(71) Applicant: International Business Machines Corporation, Armonk, NY (US)

(72) Inventors: Zachary A. Silverstein, Jacksonville, FL (US); Lisa Seacat DeLuca, Baltimore, MD (US); Jeremy R. Fox, Georgetown, TX (US); Clement Decrop, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/026,750

(22) Filed: Sep. 21, 2020

(65) Prior Publication Data

US 2022/0092485 A1    Mar. 24, 2022

(51) Int. Cl.
*G06Q 10/02* (2012.01)
*G06Q 10/06* (2012.01)

(52) U.S. Cl.
CPC ....... *G06Q 10/02* (2013.01); *G06Q 10/06314* (2013.01)

(58) Field of Classification Search
CPC .............................................. G06Q 10/06314
USPC ........................................................... 705/5
See application file for complete search history.

(56) References Cited

U.S. PATENT DOCUMENTS

| 7,280,975 | B1 | 10/2007 | Donner |
| 9,338,622 | B2 | 5/2016 | Bjontegard |
| 2008/0201647 | A1* | 8/2008 | Lagerstedt ............. H04L 67/18 715/748 |
| 2009/0138244 | A1* | 5/2009 | Schuler .................. G16H 40/67 703/2 |
| 2010/0146869 | A1 | 6/2010 | Stelmaszek |
| 2013/0124234 | A1 | 5/2013 | Nilsson |

(Continued)

FOREIGN PATENT DOCUMENTS

| CN | 109313768 A | 2/2019 | |
| WO | 2009108641 A2 | 9/2009 | |
| WO | WO-2011159811 A2 * | 12/2011 | ........... G06F 3/0346 |

OTHER PUBLICATIONS

A method of using street views for calculating shaded area of a personal navigation device. Aug. 30, 2018. IP.com PAD, The IP.com Journal. pp. 2-6. https://priorart.ip.com/IPCOM/000255097. (Year: 2018).*

(Continued)

*Primary Examiner* — Jeff Zimmerman
*Assistant Examiner* — Hunter A Molnar
(74) *Attorney, Agent, or Firm* — Stephanie L. Carusillo

(57) ABSTRACT

A system for a dynamic weather-driven seat selection is provided. A computing device receives (i) weather data, (ii) venue data for a physical venue, and (iii) user preferences, the user preferences including preferred sun exposure information for a user. The computing device predicts cloud coverage and available shade for the physical venue, based, at least in part, on the weather data and the venue data. The computing device generates a sun exposure profile for the physical venue, based, at least in part, on the predicted cloud coverage and available shade. The computing device provides a user with a dynamic seat selection for a scheduled event at the physical venue based, at least in part, on the user preferences and the sun exposure profile.

20 Claims, 8 Drawing Sheets

(56) References Cited

U.S. PATENT DOCUMENTS

| | | | |
|---|---|---|---|
| 2014/0195277 A1* | 7/2014 | Kim | G08B 5/221 |
| | | | 705/5 |
| 2015/0242889 A1 | 8/2015 | Zamer | |
| 2017/0090070 A1* | 3/2017 | Root | G01W 1/08 |
| 2017/0270587 A1* | 9/2017 | Wolfson | G06Q 10/02 |
| 2017/0364835 A1* | 12/2017 | Baker | G06Q 10/02 |
| 2017/0372390 A1 | 12/2017 | Lokesh | |
| 2018/0082357 A1* | 3/2018 | Kaye | G06F 16/951 |
| 2019/0063947 A1* | 2/2019 | Beaurepaire | G01C 21/3685 |
| 2019/0139105 A1 | 5/2019 | McGuire | |
| 2019/0213621 A1 | 7/2019 | Groetzinger | |
| 2021/0158423 A1* | 5/2021 | Ngo | G06Q 10/02 |

OTHER PUBLICATIONS

"Buy sports, concert and theatre tickets on StubHub!", © 2000-2020 StubHub, 2 pages, <https://www.stubhub.com/>.

"IBM and Mercedes-Benz Stadium", IBM, Printed Aug. 4, 2020, 5 pages, <https://www.ibm.com/sports/atlanta-stadium/>.

"Pogoseat: Upgrade Your Game", © 2018 Pogoseat, 5 pages, <https://pogoseat.com/>.

"SeatGeek", Your Ticket to Sports, Concerts & More, © 2020 SeatGeek, 4 pages, <https://seatgeek.com/>.

"TicketMaster", Can I exchange or upgrade my tickets?, © Ticketmaster 2020, 1 page, <https://help.ticketmaster.com/s/article/Can-I-exchange-or-upgrade-my-tickets?language=en_US>.

"WIRED", Sep. 2016, 3 pages, <https://www.wired.com/2016/09/>.

Fox, Joe, "How to find the shade at Dodger Stadium", Los Angeles Times, Mar. 22, 2018, 14 pages, <https://www.latimes.com/projects/la-sp-dodger-stadium-shadiest-seats/>.

Hessong, Athena, "The Difference Between Air Temperature in Shade & in Sun", © Copyright 2020 Hearst Communications, Inc., 5 pages, <https://homeguides.sfgate.com/difference-between-air-temperature-shade-sun-92497.html>.

Veeraraghavan et al., "Measuring Seat Value in Stadiums and Theaters", Jul. 2010, 38 pages, <https://repository.upenn.edu/oid_papers/57/>.

Mell et al., "The NIST Definition of Cloud Computing", Recommendations of the National Institute of Standards and Technology, NIST Special Publication 800-145, Sep. 2011, 7 pages.

\* cited by examiner

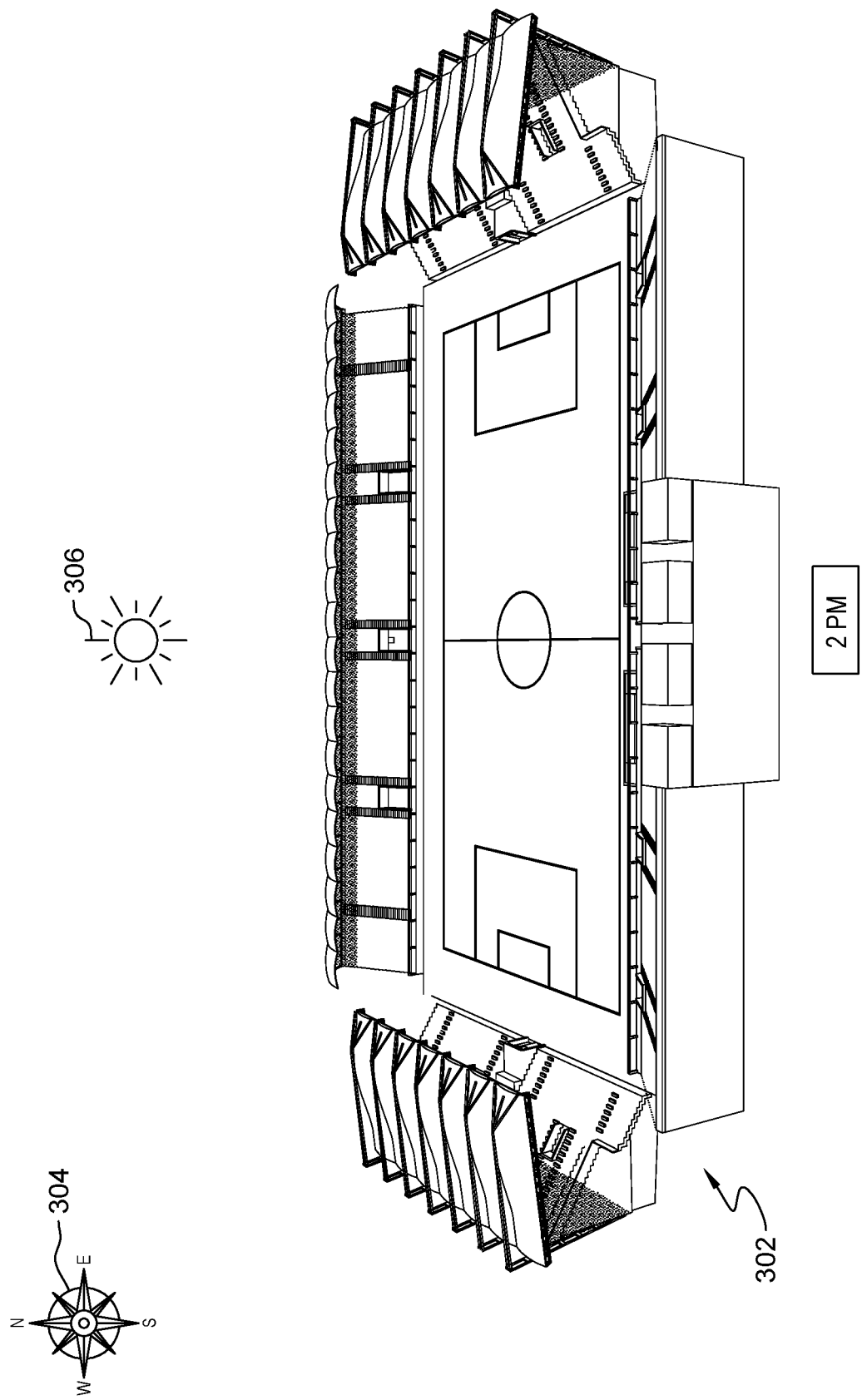

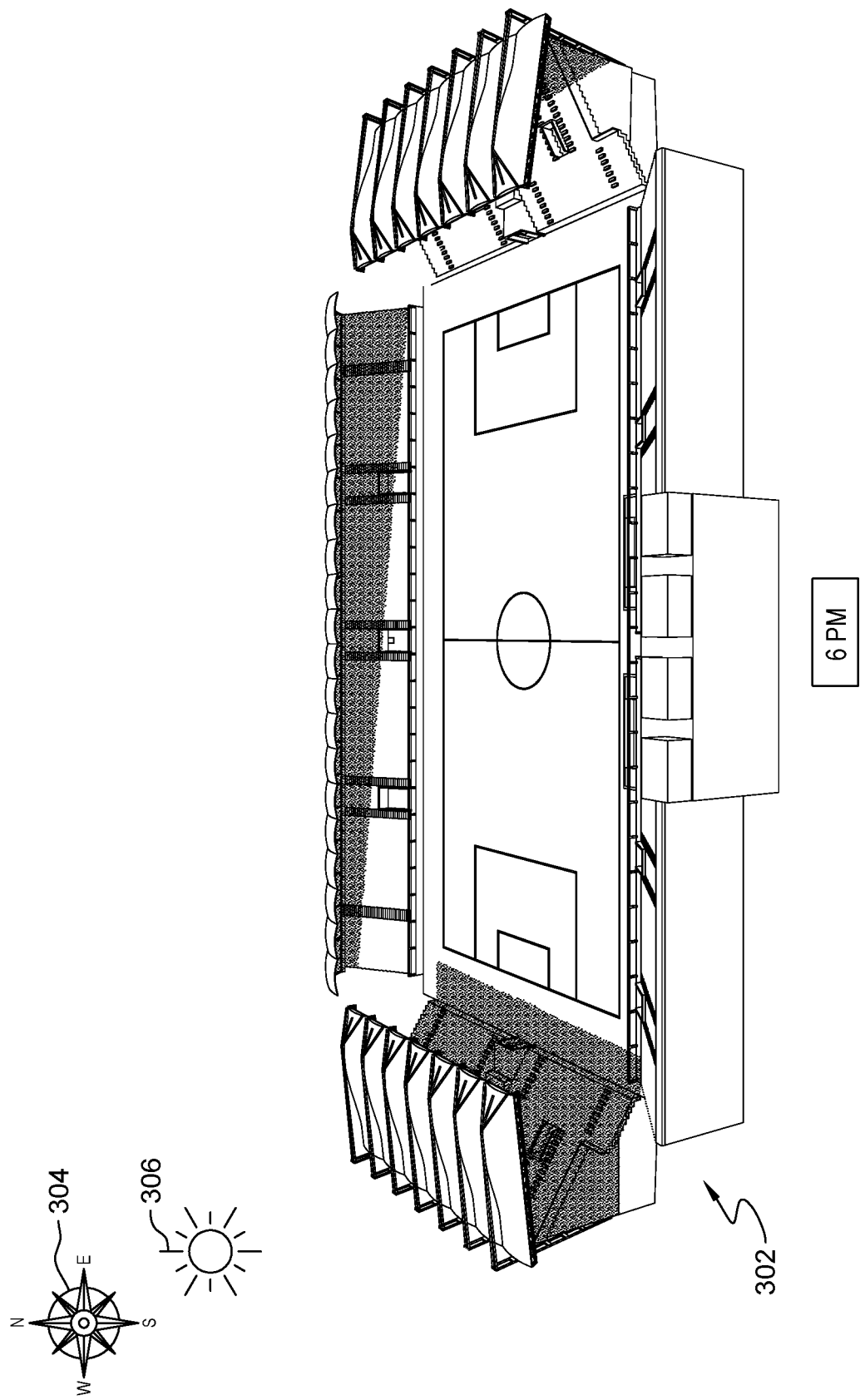

DYNAMICALLY PREDICTING VENUE ACTIVITY BASED ON WEATHER DATA

BACKGROUND OF THE INVENTION

The present invention relates generally to the field of venue activity, and more particularly to using weather-driven data to predict venue activity.

Generally, tickets to attend events held at venues are provided by a static platform that often displays a virtual venue. The virtual venue generally provides an organizational structure to the layout of the sections and seats and allows users to select the seat they wish to occupy for the duration of the in-person event.

SUMMARY

Embodiments of the present invention provide a method, system, and program product for a dynamic weather-driven seat selection system.

A first embodiment encompasses a method for dynamic weather-driven seat selection. One or more processors receive (i) weather data, (ii) venue data for a physical venue, and (iii) user preferences, the user preferences including preferred sun exposure information for a user. The one or more processors predict cloud coverage and available shade for the physical venue, based, at least in part, on the weather data and the venue data. The one or more processors generate a sun exposure profile for the physical venue, based, at least in part, on the predicted cloud exposure and available shade. The one or more processors provide a user with a dynamic seat selection for a scheduled event at the physical venue based, at least in part, on the user preferences and the sun exposure profile.

A second embodiment encompasses a computer program product for dynamic weather-driven seat selection. The computer program product includes one or more computer-readable storage media and program instructions stored on the one or more computer-readable storage media. The program instructions include program instructions to receive (i) weather data, (ii) venue data for a physical venue, and (iii) user preferences, the user preferences including preferred sun exposure information for a user. The program instructions include program instructions to predict cloud coverage and available shade for the physical venue, based, at least in part, on the weather data and the venue data. The program instructions include program instructions to generate a sun exposure profile for the physical venue, based, at least in part, on the predicted cloud exposure and available shade. The program instructions include program instructions to provide a user with a dynamic seat selection for a scheduled event at the physical venue based, at least in part, on the user preferences and the sun exposure profile.

A third embodiment encompasses a computer system for dynamic weather-driven seat selection. The computer system includes one or more computer processors, one or more computer-readable storage media, and program instructions stored on the computer-readable storage media for execution by at least one of the one or more processors. The program instructions include program instructions to receive (i) weather data, (ii) venue data for a physical venue, and (iii) user preferences, the user preferences including preferred sun exposure information for a user. The program instructions include program instructions to predict cloud coverage and available shade for the physical venue, based, at least in part, on the weather data and the venue data. The program instructions include program instructions to generate a sun exposure profile for the physical venue, based, at least in part, on the predicted cloud exposure and available shade. The program instructions include program instructions to provide a user with a dynamic seat selection for a scheduled event at the physical venue based, at least in part, on the user preferences and the sun exposure profile.

BRIEF DESCRIPTION OF THE SEVERAL VIEWS OF THE DRAWINGS

FIGS. 3A-3C depict a digital venue with various sun exposure profiles, according to at least one embodiment of the present invention.

DETAILED DESCRIPTION

Figure 1:
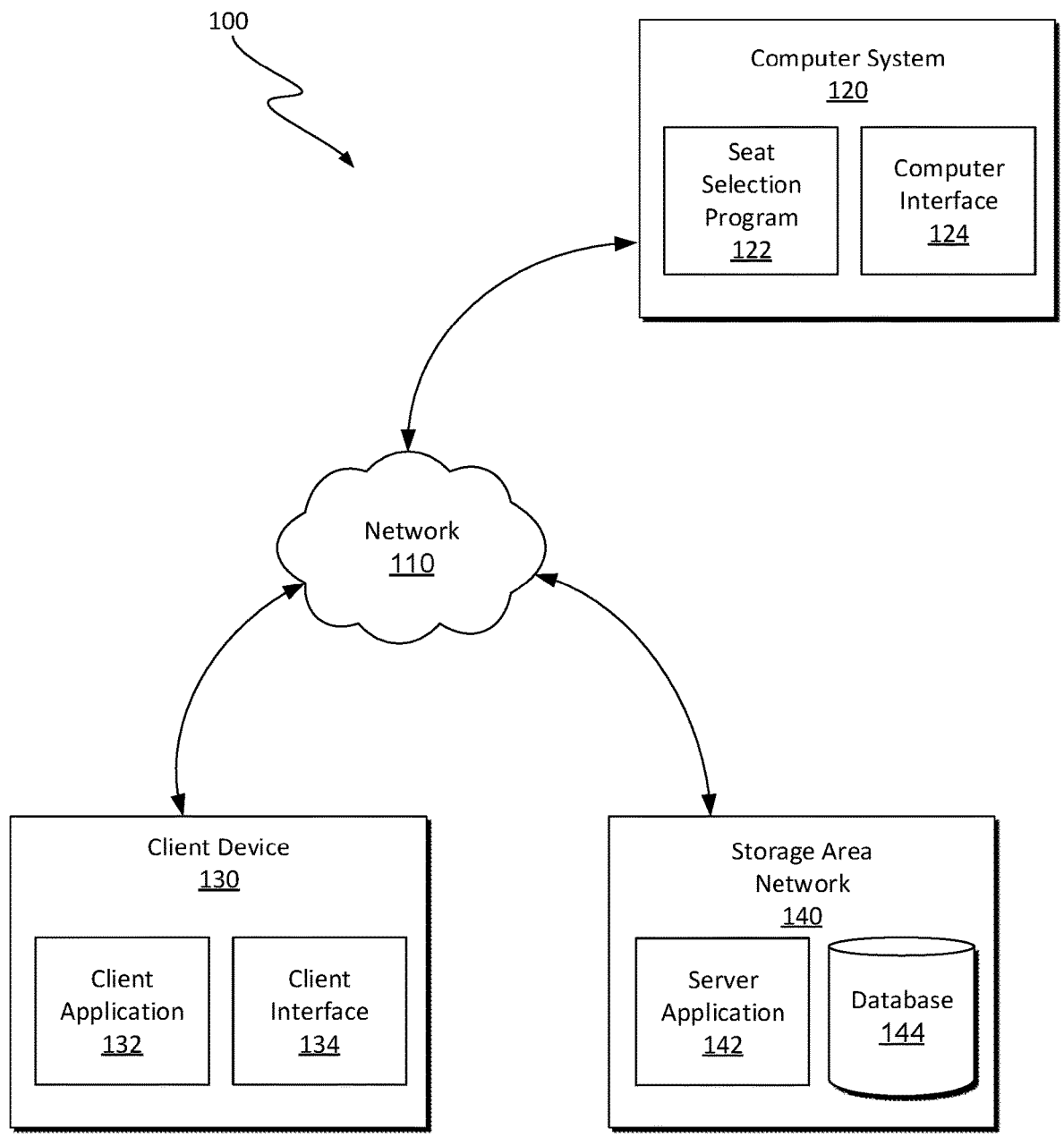
FIG. 1 is a functional block diagram illustrating a computing environment, in which a computing device generates a dynamic seat selection for a user based on, at least, a prediction of weather-driven data, in accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention recognize that in a modernized digital climate, technology can be utilized to provide users with a positive user interface experience while purchasing tickets to attend an in-person event at a venue. Embodiments of the present invention provide for a more efficient and comfortable user interface for seat selection for an in-person event at a venue based on, at least, a predicted weather profile. Furthermore, embodiments of the present invention provide for analyzing user behavior and providing a dynamic seat selection based on, at least, user preferences for the user.

Embodiments of the present invention provide a technological improvement over known solutions for ticket purchases for in-person events and venues. Embodiments of the present invention provide servers and systems that improve over conventional systems by providing for more efficient seat selection, thereby decreasing user time and the number of simultaneous users, and ultimately reducing the overall system load. Embodiments of the present invention recognize that the systems would see a decrease in load because the users are provided with a more comprehensive digital venue that would aide in the selection of seats for purchasing tickets, for example. Embodiments of the present invention further recognize that the incorporation of user preferences allows for the system to predict available seats for a user to purchase, thus reducing the amount of time the user spends on the system searching/reviewing the digital venue for the optimal seat location, which again, reduces overall system load.

The present invention will now be described in detail with reference to the Figures.

FIG. 1 is a functional block diagram illustrating computing environment, generally designated 100, in accordance with one embodiment of the present invention. Computing environment 100 includes computer system 120, client device 130 and storage area network (SAN) 140 connected over network 110. Computer system 120 includes seat selection program 122 and computer interface 124. Client device 130 includes client application 132 and client interface 134. Storage area network (SAN) 140 includes server application 142 and database 144.

In various embodiment of the present invention, computer system 120 is a computing device that can be a standalone device, a server, a laptop computer, a tablet computer, a netbook computer, a personal computer (PC), a personal digital assistant (PDA), a desktop computer, or any programmable electronic device capable of receiving, sending, and processing data. In general, computer system 120 represents any programmable electronic device or combination of programmable electronic devices capable of executing machine readable program instructions and communications with various other computer systems (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing seat selection program 122 and computer interface 124. Computer system 120 may include internal and external hardware components, as described in further detail with respect to FIG. 6.

In this exemplary embodiment, seat selection program 122 and computer interface 124 are stored on computer system 120. However, in other embodiments, seat selection program 122 and computer interface 124 are stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between computer system 120, client device 130, and SAN 140, and various other computer systems (not shown), in accordance with desired embodiment of the present invention.

In the embodiment depicted in FIG. 1, seat selection program 122, at least in part, has access to client application 132 and can communicate data stored on computer system 120 to client device 130, SAN 140, and various other computer systems (not shown). More specifically, seat selection program 122 defines a user of computer system 120 that has access to data stored on client device 130 and/or database 144.

Seat selection program 122 is depicted in FIG. 1 for illustrative simplicity. In various embodiments of the present invention, seat selection program 122 represents logical operations executing on computer system 120, where computer interface 124 manages the ability to view these logical operations that are managed and executed in accordance with seat selection program 122. In some embodiments, seat selection program 122 represents a cognitive AI system that processes and analyzes input and output (I/O). Additionally, seat selection program 122, when executing cognitive AI processing, operates to learn from the I/O that was analyzed and generates a sun exposure profile of the event stadium and provides a dynamically priced seat for the user based on, at least, the sun exposure profile of the event stadium.

Computer system 120 includes computer interface 124. Computer interface 124 provides an interface between computer system 120, client device 130, and SAN 140. In some embodiments, computer interface 124 can be a graphical user interface (GUI) or a web user interface (WUI) and can display, text, documents, web browsers, windows, user options, application interfaces, and instructions for operation, and includes the information (such as graphic, text, and sound) that a program presents to a user and the control sequences the user employs to control the program. In some embodiments, computer system 120 accesses data communicated from client device 130 and/or SAN 140 via a client-based application that runs on computer system 120. For example, computer system 120 includes mobile application software that provides an interface between computer system 120, client device 130, and SAN 140. In various embodiments, computer system 120 communicates the GUI or WUI to client device 130 for instruction and use by a user of client device 130.

In various embodiments, client device 130 is a computing device that can be a standalone device, a server, a laptop computer, a tablet computer, a netbook computer, a personal computer (PC), a personal digital assistant (PDA), a desktop computer, or any programmable electronic device capable of receiving, sending and processing data. In general, computer system 120 represents any programmable electronic device or combination of programmable electronic devices capable of executing machine readable program instructions and communications with various other computer systems (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing client application 132 and client interface 134. Client device 130 may include internal and external hardware components, as described in further detail with respect to FIG. 6.

Client application 132 is depicted in FIG. 1 for illustrative simplicity. In various embodiments of the present invention client application 132 represents logical operations executing on client device 130, where client interface 134 manages the ability to view these various embodiments, and client application 132 defines a user of client device 130 that has access to data stored on computer system 120 and/or database 144.

Storage area network (SAN) 140 is a storage system that includes server application 142 and database 144. SAN 140 may include one or more, but is not limited to, computing devices, servers, server-clusters, web-servers, databases and storage devices. SAN 140 operates to communicate with computer system 120, client device 130, and various other computing devices (not shown) over a network, such as network 110. For example, SAN 140 communicates with seat selection program 122 to transfer data between computer system 120, client device 130, and various other computing devices (not shown) that are not connected to network 110. SAN 140 can be any computing device or a combination of devices that are communicatively connected to a local IoT network, i.e., a network comprised of various computing devices including, but are not limited to, computer system 120 and client device 130, to provide the functionality described herein. SAN 140 can include internal and external hardware components as described with respect to FIG. 6. Embodiments of the present invention recognize that FIG. 1 may include any number of computing devices, servers, databases, and/or storage devices, and the present invention is not limited to only what is depicted in FIG. 1. As such, in some embodiments some of the features of computer system 120 are included as part of SAN 140 and/or another computing device.

Additionally, in some embodiments, SAN 140 and computer system 120 represent, or are part of, a cloud computing platform. Cloud computing is a model or service delivery for enabling convenient, on demand network access to a shared pool of configurable computing resources (e.g., networks, network bandwidth, servers, processing, memory, storage, applications, virtual machines, and service(s) that can be rapidly provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model, and a software as a service (SaaS) model, and can be implemented as various deployment models as a private cloud, a community cloud, a public cloud, and a hybrid cloud. In various embodiments, SAN 140 represents a database or website that includes, but is not limited to, data associated with weather patterns.

SAN 140 and computer system 120 are depicted in FIG. 1 for illustrative simplicity. However, it is to be understood that, in various embodiments, SAN 140 and computer system 120 can include any number of databases that are managed in accordance with the functionality of seat selection program 122 and server application 142. In general, database 144 represents data and server application 142 represents code that provides an ability to use and modify the data. In an alternative embodiment, seat selection program 122 can also represent any combination of the aforementioned features, in which server application 142 has access to database 144. To illustrate various aspects of the present invention, examples of server application 142 are presented in which incident response program 122 represents one or more of, but is not limited to, dynamic seat selection for a user.

In some embodiments, server application 142 and database 144 are stored on SAN 140. However, in various embodiments, server application 142 and database 144 may be stored externally and accessed through a communication network, such as network 110, as discussed above.

Seat selection program 122 is depicted in FIG. 1 for illustrative simplicity. Computer system 120, however, can include any number of logics and/or programs that are managed in accordance with seat selection program 122. In general, computer system 120 manages access to seat selection program 122, which represents a physical or virtual resource. In some embodiments, seat selection program 122 includes certain information and represents code that, when executed, enables computer system 120 to take specific action with respect to another physical resource and/or virtual resource based on, but not limited to, that certain information. In other words, in such embodiments, seat selection program 122 manages, at least, the ability of computer system 120 to take various actions with respect to one or more physical resources and/or virtual resources. In some embodiments, seat selection program 122 can also embody any combination of the aforementioned elements. To illustrate various aspects of the present invention, examples of seat selection program 122 are presented in which seat selection program 122 includes one or more of a user profile request, a sun exposure profile, and manual and IoT feedback, but embodiments of seat selection program 122 are not limited thereto. Embodiments of the present invention recognize that seat selection program 122 may include other forms of transactions that are known in the art.

In various embodiments of the present invention, a user of client device 130 generates a venue seat selection, utilizing, at least, client application 132. In various embodiments, client application 132 detects that a venue seat selection occurs, and a seat request is generated. In various embodiments of the present invention, client application 132 communicates the seat request to seat selection program 122.

In various embodiments, seat selection program 122 receives the seat request from client application 132. Seat selection program 122 analyzes the seat request and identifies: (i) the venue section and seat, and (ii) whether the venue section and seat are located within predicted shade created by the building of the venue or located within sunlight, for example. Embodiments of the present invention recognize that the predicted shade or sunlight is determined based on, at least, data from a meteorologist/weather webpage.

In various embodiments of the present invention, computer interface 124 represents a GUI or a WUI that is shared with client application 132. In various embodiments, the GUI or WUI includes: (i) a visual depiction of the venue where an in-person event (e.g., sports match, live concert, etc.) is taking place at some threshold point in time, wherein the venue is segmented into sections and seats contained within those sections, (ii) a visual representation of where the shade and/or sun is located on the seats of the venue throughout the length of the in-person event, and (iii) a price value assigned to each seat, wherein the price value is based on, at least, (a) a predetermined price value set by the owners/organizers of the venue/in-person event, and (b) how the shade and/or sun impacts each individual seat. In various embodiments, a user of client device 130 has access to the GUI or WUI, where the user navigates the GUI or WUI and can interact to select a seat(s) for the in-person event taking place at the venue.

In various embodiments, seat selection program 122 prompts the user of client device 130 to create a user profile that includes, but is not limited to, user preference based on weather (e.g., seat located within the shade or the sun). In various embodiments, seat selection program 122 utilizes the user profile to determine one or more potential seats that the user selects from to attend the in-person event at the venue.

In various embodiments, seat selection program 122 generates a sun exposure profile based on, at least, weather data. Seat selection program 122 communicates with SAN 140 and access database 144 where seat selection program 122 retrieves data regarding (i) historical sun patterns, (ii) historical cloud/inclement weather patterns, (iii) predicted sun patterns, and (iv) predicted cloud/inclement weather patterns.

In various embodiments, seat selection program 122 retrieves data from database 144 that includes, but is not limited to, (i) size/architecture of the venue, (ii) seating arrangement of the venue, (iii) stadium orientation, (iv) historical temperature data, and (v) in-venue IoT sensor devices. In various embodiments, seat selection program 122 analyzes the (i) size/architecture of the venue, (ii) seating arrangement of the venue, (iii) stadium orientation, (iv) historical temperature data, and (v) in-venue IoT sensor devices, and generates a sun exposure profile that represents the predicted temperature inside the venue, and more specifically, at least, the predicted temperature of each individual seat. Embodiments of the present invention recognize that various sensors are located within the venue and are connected to an IoT system. Additionally, the various sensors measure the average temperature of the venue and sections/seats and measure the solar radiation flux density (W/m$^2$) (e.g., sunlight) using a radiometer. In some embodiments, pyranometers and spectrophotometers measure the amount of sunlight and determine whether or not shade is being produced, wherein the shade is produced by an inanimate object (e.g., clouds, or a structure that casts a shadow as the sun progress throughout various points in time).

In various embodiments of the present invention, database 144 includes, but is not limited to, data about the venue that describes the size and architecture of the venue, the arrangement of the seats and sections of the venue, and the orientation of the venue associated with cardinal directions. Additionally, database 144 includes historical temperature data and historical UV index and luminosity data that is obtained from, at least, the IoT sensors located within the venue. In various embodiments, sensors are affixed to the various seats within the venue that detect the temperature and the UV index and luminosity of the seat.

In various embodiments of the present invention, database 144 includes, but is not limited to, weather and meteorological data. In various embodiments, this data is obtained from a source that routinely collects and analyzes this data for public knowledge. In various embodiments, the weather and meteorological data includes, but is not limited to, historical and predicted (i) sun position, (ii) cloud index, (iii) temperature, (vi) UV index, (v) humidity, (vi) pressure, (vii) precipitation data, and (viii) the corresponding dates and times of the measurements.

In various embodiments, seat selection program 122 utilizes the data, at least, stored on database 144, to generate the sun exposure profile. In various embodiments, seat selection program 122 generates a sun exposure profile that illustrates various layouts based on, at least, the weather forecast, stadium orientation, and weather variances. In various embodiments, the layouts represent thresholds periods of time and the activities associated with those threshold periods of time. In various embodiments, the layouts include, but are not limited to, (i) a pregame walk (e.g. the path of a trolley or tram, a parking lot, a personal path from the user's vehicle to the venue location), (ii) the in-person event taking place at noon (e.g., minimal/no shade and highest temperatures of the day), (iii) the in-person event taking place in the morning (e.g., the west most side of the venue would be encompassed by shade and low temperatures), (vi) the in-person event taking place in the afternoon (e.g., the east-most side of the venue would be encompassed by shade and the associated temperatures), (v) the in-person event taking place in the evening/nighttime (e.g., no sunlight and lowest possible temperatures), and (vi) the walk from the stadium to the trolley or tram, the parking lot, and a personal path back to the user's vehicle at the conclusion of the in-person event. Embodiments of the present invention provide that areas of the venue encompassed in permanent shade (e.g., because of the architecture of the venue) would be indicated on the layouts and the temperatures would be noted as generally lower than other areas that are contained within direct sunlight at given times through the day and sun positioning. Embodiments of the present invention further provide that the sun exposure profile would include weather conditions for the in-person event that include, but are not limited to, rain, snow, wind, etc. In various embodiments, seat selection program 122 provides users of client device 130 the ability to provide feedback validating the predicted sunlight/shade of the areas and the users' respective seat(s). Embodiments of the present invention recognize that users may provide feedback in the form of video images or text. Embodiments of the present invention also analyze broadcast data that includes a video analysis of the venue to determine the sections/seats encompassed by direct sunlight or shade.

In various embodiments, seat selection program 122 monitors public social media to identify posts regarding the validation of the sunlight/shade of the predicted sun exposure profile. Seat selection program 122 analyzes the posts for location, time, and orientation of the photo and compares social media posts regarding sunlight exposure/shade against the predicted sun exposure profile.

In various embodiments, seat selection program 122 receives IoT sensor data from various IoT sensors contained within the venue, throughout the duration of the in-person event, that provide data regarding the temperature, UV index, and luminosity (e.g., direct sunlight exposure, shade, or a mixture of sunlight and shade). Seat selection program 122 analyzes the IoT sensor data and compares the data against the predicted sun exposure profile and updates the predicted sun exposure profile based on, at least, the IoT sensor data.

In various embodiments, the sun exposure profile is displayed as on overlay with the digital venue to illustrate the predicted sections/seats that are within direct sunlight exposure and which sections/seats are within the shade. In various embodiments, the sun exposure profile provides an overlay to the digital venue that illustrates (i) the predicted temperature for each of the identified available seats throughout the duration of the scheduled event, and (ii) the predicted sun exposure for each of the identified available seats throughout the duration of the scheduled event. As described above, the digital venue is provided as a GUI or WUI to a user of client device 130. In various embodiments, the digital venue will include the sections/seats that are contained within the sunlight and shade, and a slider will be provided for the user of client device 130 to change the time and how the sunlight and shade affect the digital venue. Additionally, the digital venue will include the predicted temperature when a specific section/seat are selected and a slider will be provided to illustrate how the temperature changes over time as the slider is moved by a user of client device 130. The digital venue allows a user of client device 130 to filter available sections/seats based on, at least, predicted sunlight, shade, and temperature. In various embodiments, the digital venue provides an alert to the user of client device 130 of sections/seats that are exposed to continuous direct sunlight that glare may affect the viewing enjoyment of the in-person event. In various embodiments, seat selection program 122 analyzes the choices selected by a user of client device 130 and stores the choices and user preferences on database 144 for subsequent use to generate a dynamic seat selection for future in-person events that the user wishes to attend. In various embodiments, seat selection program 122 correlates the user preferences with the sun exposure profile to identify available seats that reach a threshold value of matching between a preferred sun exposure for the user and a predicted sun exposure at the physical venue during the scheduled event. In various embodiments, seat selection program 122 determines the user's preference and correlates that preference (e.g., 50% sun exposure) against all available seats at the physical venue for the scheduled event and identifies a range of available seats that meet a threshold value for the user preference (i.e., all available seats that would be exposed 50% of the time to the sun, and available seats that are exposed to the sun within a range such as 40%-60% sun exposure).

In an example, user Za resides in State Zb and wishes attend the local sports match being played at venue Zc. User Za accesses an online website and uses a generic ticket purchasing program to purchase tickets to the sports match at venue Zc. In this example, user Za is provided with a layout of venue Zc and user Za is instructed to select an available seat within one of the various sections of venue Zc. In this example, user Za is unfamiliar with the layout of venue Zc and selects a seat that is consistently within the shade of the roof of venue Zc, when user Za would have preferred to sit in sunlight for the duration of the sports match at venue Zc. In this example, the generic ticket purchasing program does not include the sun exposure profile and the dynamic seat selection of embodiments of the present invention, and user Za was unable to correctly select a seat that user Za would have preferred. In this example, user Za would have selected an appropriate seat if user Za had access to the digital venue with the accompanying sun exposure profile that illustrated sections/seats within the sunlight and which sections/seats were contained within the shade throughout the duration of the sports match, as described in the context of embodiments of the present invention.

In one example embodiment of the present invention, user Aa resides in State Ab and wishes to attend the local sports match being played at venue Ac. User Aa accesses an online website to purchase tickets (e.g., the tickets are directly associated with specific seats within sections of venue Ac) for themselves and friends. In this example embodiment, user Aa notices that the digital venue provides a sun exposure profile for the day of the sports match. The sun exposure profile illustrates the temperature of the sections and the seats within the sections and further illustrates the predicted sunlight and exposure and shade cast upon the seats within venue Ac. In this example embodiment, the sun exposure profile is generated based on, at least, seat selection program 122 retrieving historical and predicted weather and meteorological data from database 144. In various embodiments, seat selection program 122 identifies seats within the shade and provides a supplementary voucher to users that select those seats for the in-person game. In this example embodiment, the supplementary voucher provides a discounted price (e.g., $5 dollars) for the purchase of a sweatshirt from the gift shop at venue Ac. In this example embodiment, the supplementary voucher for the sweatshirt is provided because seat selection program 122 predicts that the weather will be cold outside based on, at least, the sun exposure profile, and the sweatshirt will provide some protection from the cold weather outside. User Aa selects the seats within the shade that include the supplementary voucher and seat selection program 122 stores this data as a user preference and confirms the purchase of the tickets with the venue and provides a receipt to user Aa. In this example embodiment, user Aa arrives at the venue for the in-person event with their ticket and purchases a sweatshirt from the gift shop at venue Ac.

In a second example embodiment, user Ba resides in State Aa wishes to attend the local sports match being played at venue Ac. User Ba accesses an online website to purchases tickets (e.g., the tickets are directly associated with specific seats within sections of venue Aa) for themselves and friends. In this example embodiment, user Ba notices that the digital venue provides a sun exposure profile for the day of the sports match. The sun exposure profile illustrates the temperature of the sections and the seats within the sections and further illustrates the predicted sunlight and exposure and shade cast upon the seats within venue Aa. In this example embodiment, the sun exposure profile is generated based on, at least, seat selection program 122 retrieving historical and predicted weather and meteorological data from database 144. In various embodiments, seat selection program 122 identifies seats within the shade and provides a supplementary voucher to users that select those seats for the in-person game. In this example embodiment, the supplementary voucher provides a discounted price (e.g., $5 dollars) for the purchase of a sweatshirt from the gift shop at venue Ac. However, in this example embodiment, user Ba wishes to maximize their exposure to the weather and sunlight to reflect how the players experience the weather and sunlight on the field during the sports match. User Ba selects the available seats closest to field where the sports match is being played within the sunlight and seat selection program 122 stores this data (e.g., seats within sunlight and proximity to the field) as a user preference and confirms the purchase of the tickets with the venue and provides a receipt to user Ba.

Embodiments of the present invention provide that the sun exposure profile and the dynamic seat selection allow for a decreased load on the servers and system that maintain and operate the ticket purchasing platform. In various embodiments, the inclusion of the sun exposure profile allows for users to more accurately and efficiently select seats that they users wish to sit in which reduces traffic on to the server and allows for a greater turnover of simultaneous users on the system. Additionally, the dynamic seat selection further provides users with the opportunity to select a seat predicted to meet their preferences on seat location, which would decrease the time spent of the many users on the system at any given point in time.

Embodiments of the present invention provide for seat selection by a user based on, at least, sunlight and/or shady areas predicted utilizing the sun exposure profile included with price and location of the seat. In various embodiments, seat selection program 122 utilizes the data associated with the sun exposure profile to recommend the users of the dynamic seat selection on the best relevant times to take breaks or to purchase refreshments based on, at least, the predicted sun exposure profile. In various embodiments, seat selection program 122 utilizes the predicted sun exposure profile at a seasonal level as opposed to a daily level, wherein seat selection program 122 suggests to the user to attend an in-person event within a calendar year. For example, seat selection program 122 based on, at least, user preferences and the sun exposure profile recommends the user to attend an in-person event at the venue at the end of a month as opposed to earlier in the spring season (e.g., at the end of June).

Embodiments of the present invention further provide that a user may choose to sit in a different seat as the in-person event progresses (e.g., the user switches seats from one side of the stadium to the other during halftime of a sports event to ensure that the user sits in the shade during the entire length of the sports match). In various embodiments, if admission criteria matches for a seat change is granted then event segment data is retrieved for the user's ticket. In various embodiments, a query is performed to determine the event segment of the in-person event, and once the query is completed it is compared against the event segment data. If progression of the in-person event matches the event segment associated with the ticket access is granted. In one example embodiments, an individual might want to have access to a ticket segment in section 117, row 5, and seat 13 for the second in-person event segment. The individual approaches an usher assigned to section 117 and shows the usher their ticket segment. The ticket segment contains admission criteria information about access to ticket section 117, row 5, and seat 13. Additionally, embodiments of the present invention provide for pricing solutions for dynamic seat selection, wherein the weather behaves erratically, and the weather impairs the ability of the user to perceive the in-person event. In various embodiments, seat selection program 122 receives updated data, at least, from (i) the IoT sensor devices, (ii) live broadcast data, and (iii) social media crawling and determines to provide a supplementary voucher for the user for the hindrance of the weather impacting the user. This could be in the form of a full refund, partial refund, discount code for a future event, benefits such as free merchandise or concessions such as food or beverage, etc.

Figure 2:
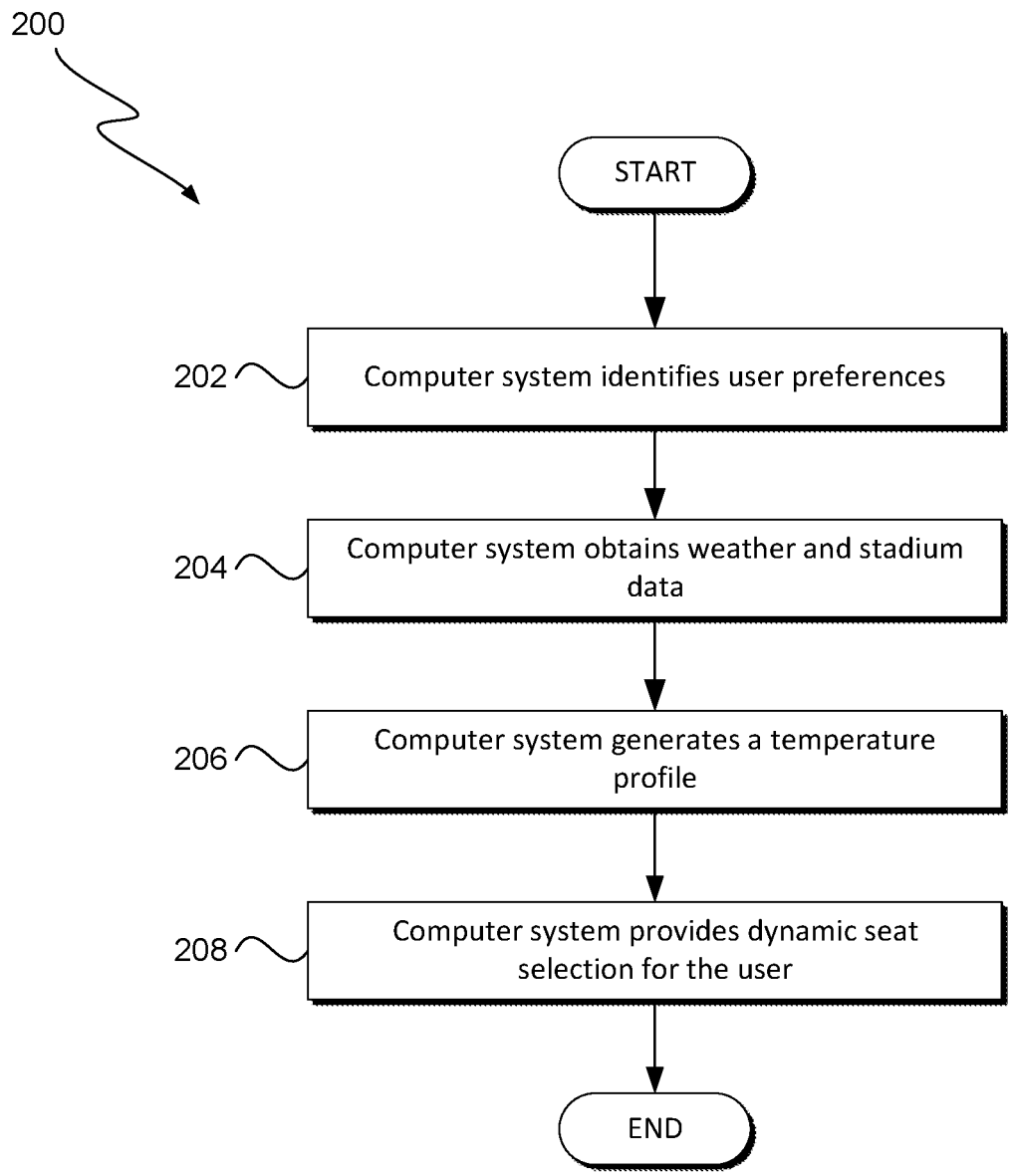
FIG. 2 illustrates operational processes of executing a system for a dynamic weather-driven seat selection, on a computing device within the environment of FIG. 1, in accordance with an exemplary embodiment of the present invention.

FIG. 2 is a flowchart, 200, depicting operations of incident response program 122 in computing environment 100, in accordance with an illustrative embodiment of the present invention. FIG. 2 also represents certain interactions between seat selection program 122 and client application 132. In some embodiments, the operations depicted in FIG. 2 incorporate the output of certain logical operations of seat selection program 122 executing on computer system 120. It should be appreciated that FIG. 2 provides an illustration of one implementation and does not imply any limitations with regard to the environments in which different embodiments may be implemented. Many modifications to the depicted environment may be made. In one embodiments, the series of operations in FIG. 2 can be performed in any order. In another embodiment, the series of operations, depicted in FIG. 2, can be performed simultaneously. Additionally, the series of operations, depicted in FIG. 2, can be terminated at any operation. In addition to the features previously mentioned, any operations, depicted in FIG. 2, can be resumed at any time.

In operation 202, seat selection program 122 identifies user preferences. In various embodiments of the present invention seat selection program 122 receives a seat request from client application 132. In various embodiments, seat selection program 122 accesses the profile of the user of client device 130 based on, at least, the seat request received from client application 132. Seat selection program 122 identifies the user's preference of seat with regards to being in the sunlight, shade, or a mixture of both throughout the in-person event. Additionally, seat selection program 122 identifies whether the user prefers to be higher up in the seats of the venue or closer to the center of venue (e.g., the field of the sports match, the stage of a concert, etc.). Lastly, seat selection program 122 identifies the price range for seats that the user prefers.

In operation 204, seat selection program 122 obtains weather and stadium data. In various embodiments, seat selection program 122 accesses database 144 and retrieves (i) data regarding predicted and historical weather patterns and (ii) data regarding the venue. In various embodiments, seat selection program 122 analyzes the predicted and historical weather patterns and identifies data that includes, but is not limited to, (i) historical temperature data, (ii) historical sun/shade data, (iii) sun position, (iv) cloud index, (v) UV index, (vi) humidity, (vii) precipitation data, and (viii) pressure. In various embodiments, seat selection program 122 analyzes the data of the venue that includes, but is not limited to, (i) IoT sensor data, (ii) venue size/architecture, (iii) stadium seating arrangement, and (vi) stadium orientation. In various embodiments, seat selection program 122 identifies data obtained by the IoT sensors that include, but are not limited to, (i) the temperatures of the various sections/seats of the venue, (ii) the UV index, and (iii) whether the sections/seats are situated in direct sunlight, shade, or a mixture of sunlight and shade.

In operation 206, seat selection program 122 generates a sun exposure profile. In various embodiments, seat selection program 122 analyzes the weather pattern data and the venue data and generates a sun exposure profile of the venue. In various embodiments, the sun exposure profile represents a predicted illustration of the sunlight exposure and shade on the venue throughout a defined time period for the in-person event. In various embodiments, seat selection program 122 predicts the cloud coverage and available shade of the seats within the venue based on, at least, (i) the predicted sun patterns, (ii) predicted cloud patterns, and (iii) predicted inclement weather patterns. In various embodiments, seat selection program 122 predicts the suns patterns as the sun travels the positioning in the sky relative to any predicted cloud patterns. In various embodiments, seat selection program 122 predicts cloud patterns and available shade based on, at least, historical cloud patterns as the clouds traveled in front of the sun obstructing the rays of light provided by the sun, where seat selection program 122 utilizes this historical data to predict how current and future cloud patterns will travel in front of the sun obstructing the rays of light provided by the sun. In various embodiments, based on, at least, the prediction of cloud patterns, seat selection program 122 predicts available shade among the seats of the venue and how long the seats will remain in available shade compared to being exposed to the sun during the scheduled event. In various embodiments, the sun exposure profile further represents the predicted temperature of the sections/seats of the venue in relation to the sunlight exposure/shade. In various embodiments, the sun exposure profile provides an overlay to the digital venue that illustrates (i) the predicted temperature for each of the identified available seats throughout the duration of the scheduled event, and (ii) the predicted sun exposure for each of the identified available seats throughout the duration of the scheduled event.

In various embodiments, seat selection program 122 generates the sun exposure profile based on, at least, an initial value that the shaded area within the venue is ten to fifteen (10-15) degrees Fahrenheit cooler than areas within the direct sunlight. In various embodiments, seat selection program 122 further modifies the sun exposure profile based on, at least, data obtained from IoT devices located throughout the venue to provide more accurate and updated data regarding the (i) sun position, (ii) cloud index, (iii) temperature, (vi) UV index, (v) humidity, and (vi) precipitation data. Additionally, in various embodiments, seat selection program 122 applies the sun exposure profile to a regression model that analyzes historical predictions and historical actual sun exposure profiles to more accurately predict future temperatures and cloud indexes.

In various embodiments, seat selection program 122 routinely receives real time weather data and IoT sensor data used to calibrate and update the sun exposure profile. In various embodiments, seat selection program 122 receives weather data associated with broadcast data and social media crawling that is stored on, at least, database 144. In various embodiments, seat selection program 122 communicates with database 144 and receives broadcast data, wherein seat selection program 122 utilizes machine vision or video and image processing of an aerial view, a seat perspective view, or a landscape view inside the venue to identify the section/seats that are within the sunlight and which section/seats are within the shade. These views may be from a device such as a camera obtained from the user, a near-by user, or a separate device (e.g., camera of another patron of the in-person event, a broadcasting camera man, or an autonomous camera). In various embodiments, seat selection program 122 communicates with database 144 and receives social media posts to identify whether users are located within the shade or sunlight. Embodiments of the present invention recognize that users may post on social media to express their opinions on how accurate the virtual venue was at identifying whether or not the users' seats were located in the sunlight or shade. In one example embodiment, a user purchased a ticket to attend an in-person event and venue A. In this example embodiment, seat selection program 122 based on, at least, the sun exposure profile, identified that the seat the user selected was located within the shade. During the duration of the in-person event, the user posts to social media that the seat has been within direct sunlight for the entire first half of the in-person event. In this embodiment, seat selection program 122 identifies that the seat was not located within the shade as initially identified and seat selection program 122 updates the virtual venue to reflect the portion of the venue that is within direct sunlight and the portion(s) of the venue that are encompassed by shade.

In various embodiments of the present invention, seat selection program 122 further receives temperature data, the UV index, and the luminosity data (e.g., direct sunlight or shade) from the IoT sensors located within the venue, which is stored on database 144. In various embodiments, seat selection program 122 analyzes the temperature data, the UV index, and the luminosity data received from database 144 and identifies whether the predicted temperature, UV index, and luminosity data matches current or real time temperature, UV index, and luminosity data. In various embodiments, seat selection program 122 updates the virtual venue based on, at least, the current or real time data received from the IoT sensor data within the venue.

In various embodiments of the present invention, seat selection program 122 analyzes the sun exposure profile and identifies sections/seats where the price value of the sections/seats should be adjusted based on, at least, the generated sun exposure profile. Embodiments of the present invention provide that seat selection program 122 identifies the prices of the various sections/seats of the venue that are initially created by the owners of the venue and/or the producers of the in-person event and further provides that seat selection program 122 has been authorized by the owners of the venue and/or the producers of the in-person event to modify the initial prices based on, at least, the generated sun exposure profile.

In various embodiments of the present invention, seat selection program 122 determines, after identifying the various historical and predicted temperatures of the sections/seats of the venue, to reduce the price values of the seats and/or provide a supplementary voucher for a long-sleeved apparel at the gift shop of the venue for the in-person event for seats that are located within the shade. Additionally, seat selection program 122 provides a supplementary voucher for a hat at the gift shop of the venue for the in-person event for seats that are located within the direct sunlight.

In operation 208, seat selection program 122 provides dynamic seat selection for the user. In various embodiments, seat selection program 122 generates a dynamic seat selection for the user based on, at least, (i) the user preferences, (ii) available seats (i.e., seats that have not yet been purchased by other users), (iii) and the sun exposure profile. In various embodiments, seat selection program 122 correlates the user preferences with the sun exposure profile to identify available seats the meet a threshold value of matching between the preferred sun exposure for the user and the predicted sun exposure at the physical venue during the scheduled event. In various embodiments, seat selection program 122 identifies one or more available seats that include a range of sun exposure relative to the user preferences. For example, the user prefers to be seated in the sun for an average of fifty percent (50%) of the time during the scheduled event, seat selection program 122 identifies one or more available seats that include, but not limited to, (i) seats that are exposed to fifty percent (50%) sun exposure, (ii) seats that are exposed to a range of greater than fifty percent (50%) to less than seventy-five percent (75%) sun exposure, and (iii) seats that are exposed to a range of less than fifty percent (50%) but greater than forty percent (40%) sun exposure. In this example, seat selection program 122 correlates the users preference of fifty percent (50%) sun exposure and correlates that with the sun exposure profile and identifies (i) two (2) available seats within the fifty percent (50%) sun exposure range, (ii) forty (40) available seats within the range of greater than fifty percent (50%) to less than seventy-five percent (75%) sun exposure, and (iii) twenty (20) available seats within the range of less than fifty percent (50%) but greater than forty percent (40%) sun exposure. In various embodiments, seat selection program 122 identifies the types of seats that the user would prefer to sit in during the in-person event (e.g., seats within the sunlight, shade, or a mixture of shade and sunlight). Seat selection program 122 communicates the dynamic seat selection to the user of client device 130 for the user to select from the identified available seats. Additionally, the dynamic seat selection provided by seat selection program 122 informs the user of the price value for the seat(s) and whether a supplementary voucher is provided in conjunction with the purchase of the seat(s). In various embodiments, as described above, the supplementary voucher is provided for a long-sleeved apparel item from the gift ship, if the seat is located within the shade, or the supplementary voucher is provided for a hat from the gift shop if the seat is located within the sunlight.

Embodiments of the present invention provide that seat selection program 122 monitors the seats provided to the user of client device for seats that have been purchased by other users while the user reviews before purchasing seat(s) for the in-person event. In various embodiments, if seat selection program 122 identifies one or more seats that are included within, at least, the dynamic seat selection, that have been purchased before the user purchases the one or more seats, then seat selection program 122 communicates an updated dynamic seat selection informing the user that the one or more seats have already been purchased.

In various embodiments, a user purchases the seat(s) identified within the dynamic seat selection and confirms the purchase with the venue and communicates a receipt with the supplementary voucher to client application 132. Embodiments of the present invention recognize that the user is not obligated to only purchase seat(s) from the dynamic seat selection and may select and purchase seats outside of the options provided by seat selection program 122.

Figure 3A:
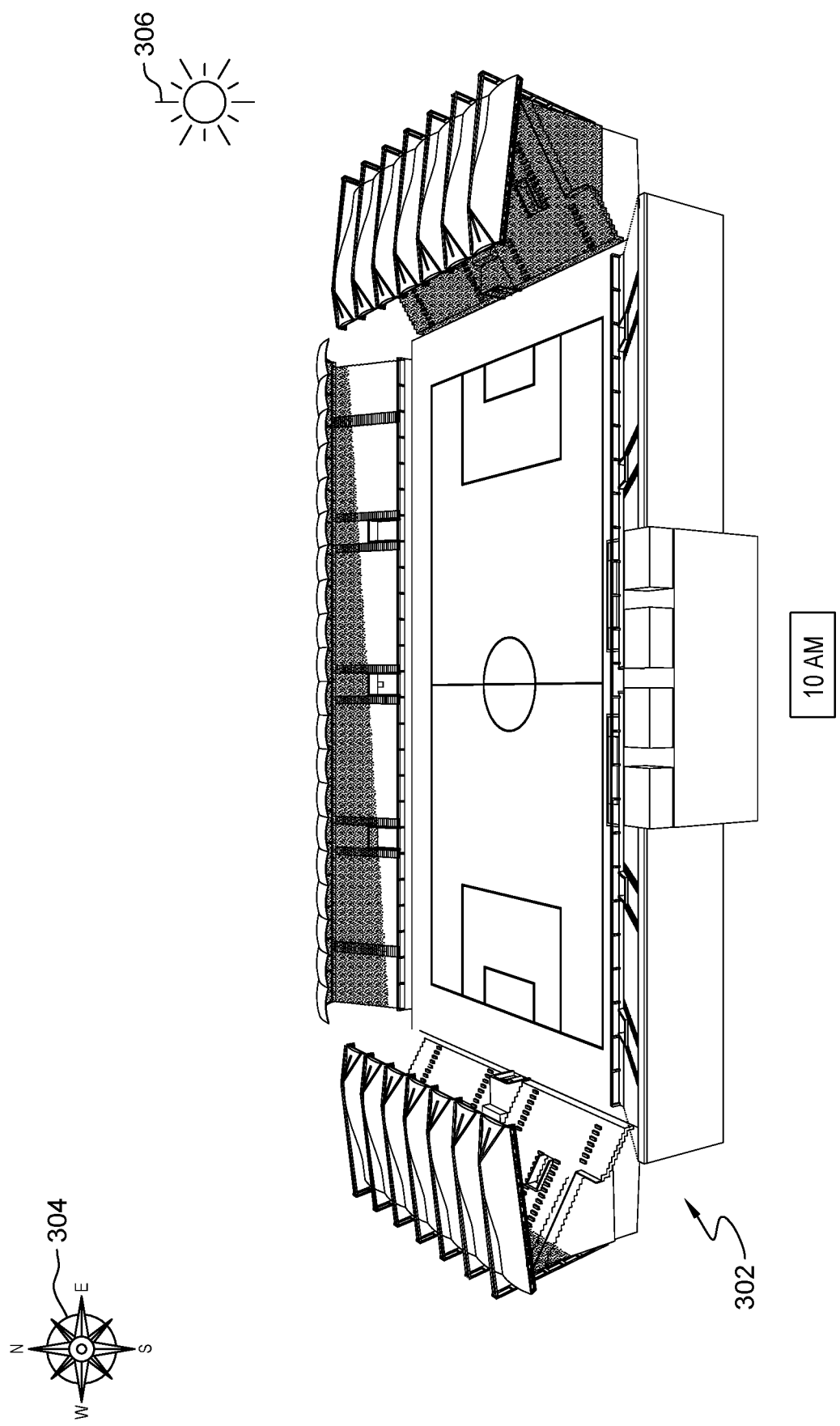

FIGS. 3A, 3B, and 3C depict a digital venue 302, wherein the sunlight and shade is reflected throughout various time periods of a day. In this embodiment, FIGS. 3A, 3B, and 3C illustrate three different time periods throughout the day with respect to an in-person event (e.g., sports match, live concert, etc.). FIGS. 3A, 3B, and 3C includes cardinal compass 304 which provides illustration of the orientation in which the sun travel from east to west and is provided for illustrative simplicity in the embodiment in which the digital venue 302 is orientated. FIG. 3A depicts the digital venue 302 affected by sunlight 306 at 10 AM, FIG. 3B depicts the digital venue 302 affected by sunlight 306 at 2 PM, and FIG. 3C depicts the digital venue 302 affected by sunlight 306 at 6 PM. In this embodiment, FIGS. 3A, 3B, and 3C depict how the angle of the sunlight is reflected upon the digital venue 302 based on, at least, (i) predicted cloud coverage, (ii) UV index, (iii) sun position, (vi) temperature, (v) venue size/architecture, (vi) venue seating arrangement, and (vii) venue orientation (e.g., cardinal direction of how the stadium is positioned). In other embodiments, additional information corresponding to the various time periods may be depicted on the digital venue 302 as well, such as predicted precipitation or wind levels. In these and other embodiments, the information is portrayed on a seat-by-seat basis, providing a user with the ability to select seats which meet the user's specific preferences for attending events as the venue.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
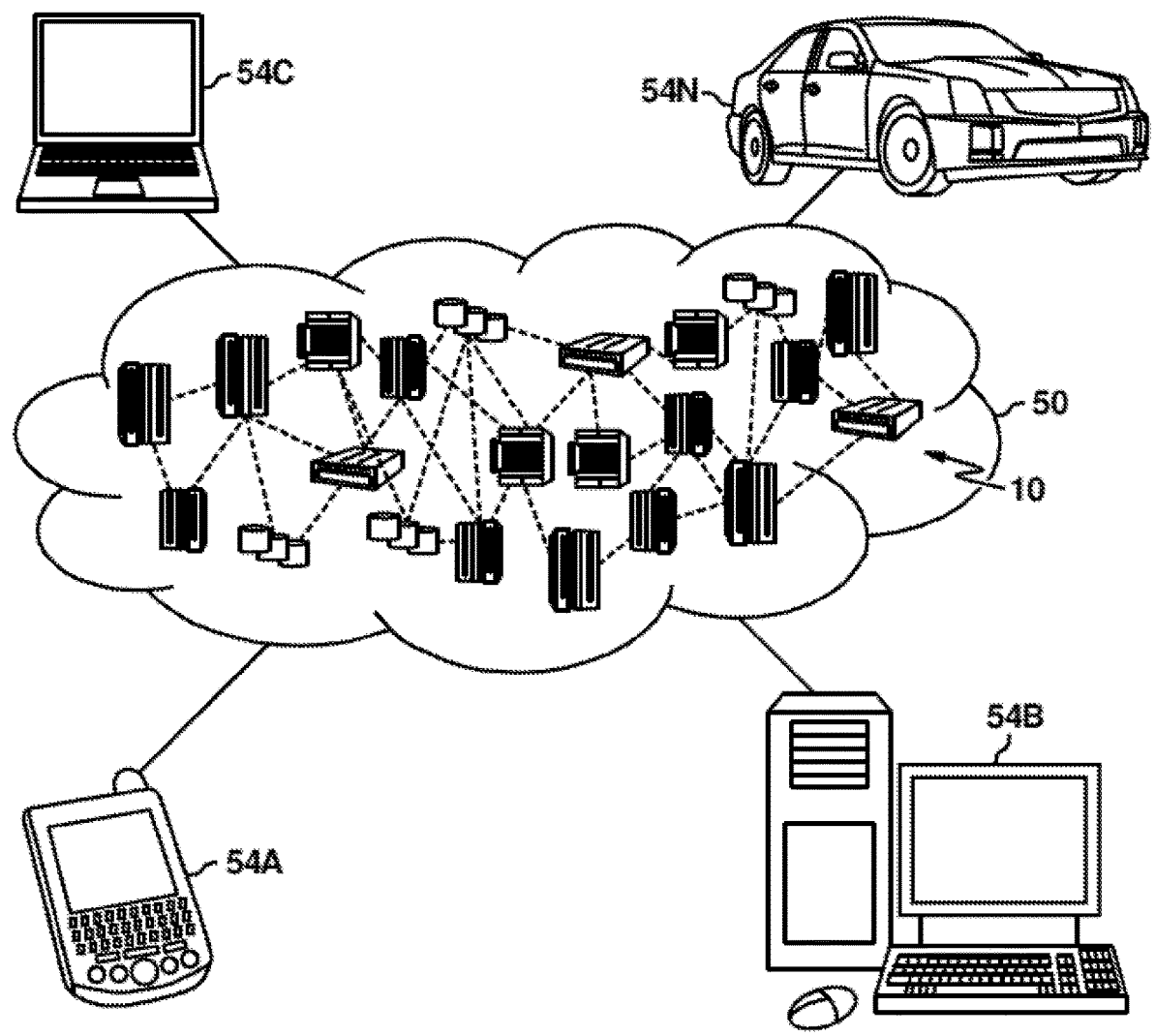
FIG. 4 depicts a cloud computing environment according to at least one embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
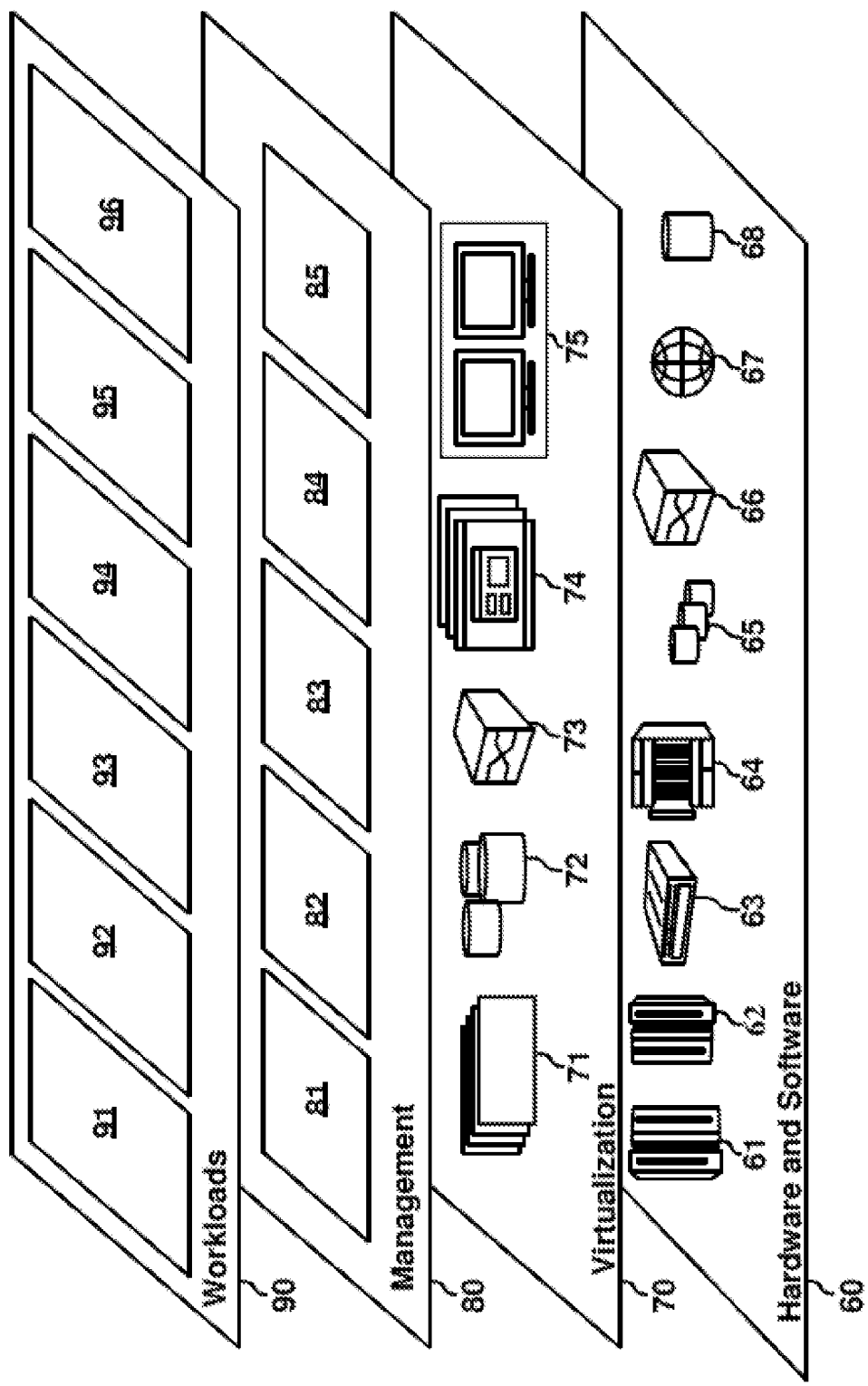
FIG. 5 depicts abstraction model layers according to at least on embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 6:
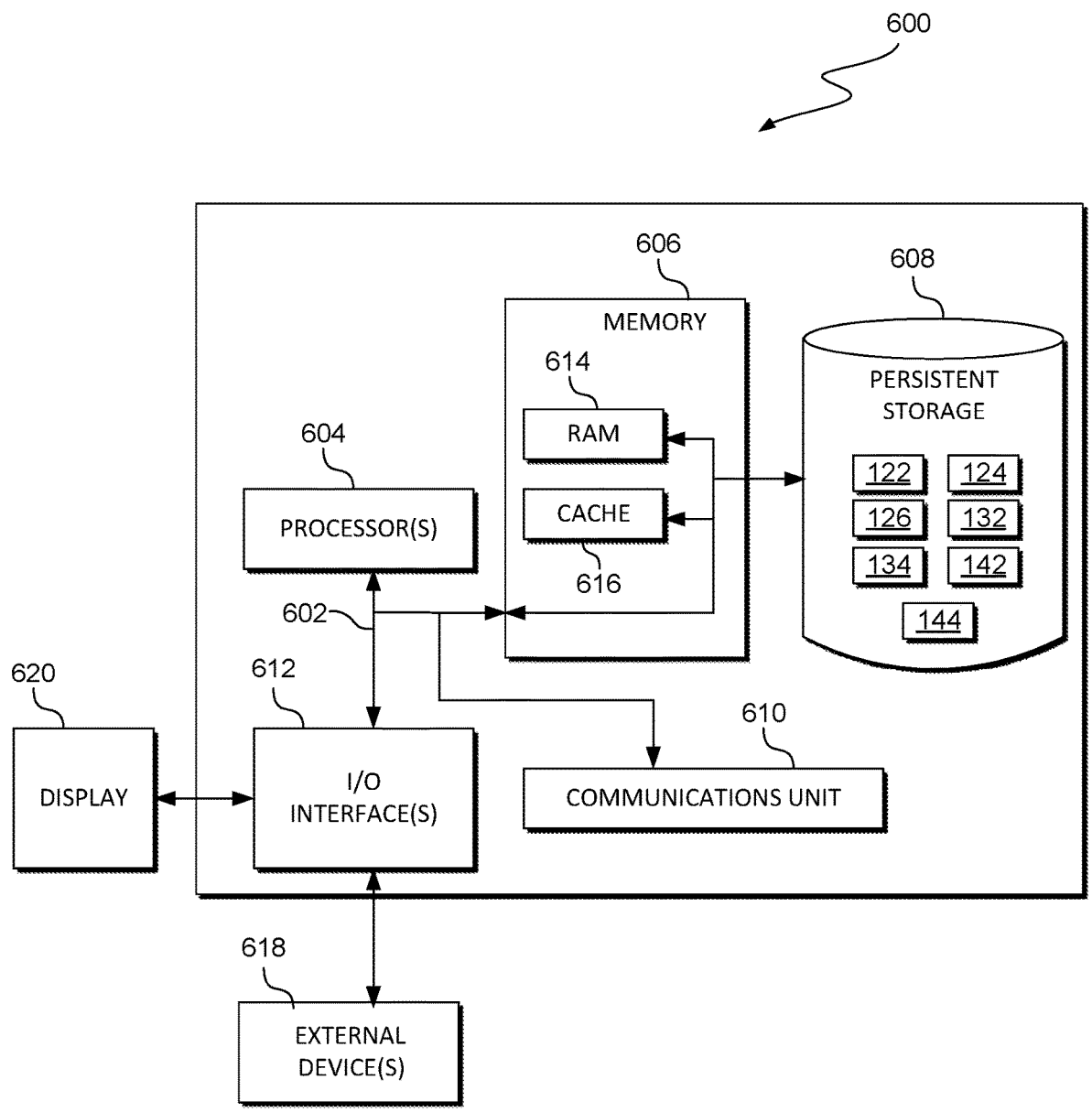
FIG. 6 depicts a block diagram of components of one or more computing devices within the computing environment depicted in FIG. 1, in accordance with an exemplary embodiment of the present invention.

FIG. 6 depicts a block diagram, 600, of components of computer system 120, client device 130, and SAN 140, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer system 120, client device 130, and SAN 140 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Seat selection program 122, computer interface 124, client application 132, client interface 134, server application 142, and database 144 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 110. In these examples, communications unit 610 includes one or more network interface cards. Communications unit 610 may provide communications through the use of either or both physical and wireless communications links. Seat selection program 122, computer interface 124, client application 132, client interface 134, server application 142, and database 144 may be downloaded to persistent storage 608 through communications unit 610.

I/O interface(s) 612 allows for input and output of data with other devices that may be connected to computer system 120, client device 130, SAN 140. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., seat selection program 122, computer interface 124, client application 132, client interface 134, server application 142, and database 144, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method, the method comprising:
   receiving, by one or more processors, (i) weather data, (ii) venue data for a physical venue, and (iii) user preferences, the user preferences including preferred sun exposure information for a user;
   generating, by one or more processors, a sun exposure profile for the physical venue, based, at least in part, on the weather data and the venue data;
   generating, by one or more processors, a digital representation of the physical venue that provides an interactive layout of the physical venue, the digital representation including an overlay that illustrates predicted sun exposure levels for respective seats at the physical venue based, at least in part, on the generated sun exposure profile, and the predicted sun exposure levels including a predicted sun exposure level for a path between the physical venue and a vehicle of the user; and
   providing, by one or more processors, a user with a dynamic seat selection for a scheduled event at the physical venue utilizing the generated digital representation, the dynamic seat selection indicating available seats that meet a threshold value of matching between a preferred sun exposure for the user and a predicted sun exposure for the scheduled event.

2. The computer-implemented method of claim 1, the method further comprising:
   generating, by one or more processors, the dynamic seat selection, wherein the dynamic seat selection includes: (i) a list of the available seats meeting the threshold value of matching, (ii) predicted temperature for each of the available seats throughout a defined time period for the scheduled event, and (iii) predicted sun exposure for each of the available seats throughout the defined time period for the scheduled event.

3. The computer-implemented method of claim 2, wherein the digital representation of the physical venue includes: (i) size/architecture of the physical venue, (ii) a seating arrangement of the physical venue, (iii) a stadium orientation of the physical venue, (iv) historical temperature data of the physical venue, and (v) an identification of in-venue IoT sensor devices.

4. The computer-implemented method of claim 3, wherein the overlay further illustrates predicted temperatures for respective seats at the physical venue.

5. The computer-implemented method of claim 1, the method further comprising:
   receiving, by one or more processors, sensor data from an in-venue IoT system corresponding to the physical venue;
   analyzing, by one or more processors, the sensor data to identify current weather data, wherein the current weather data includes temperature data and precipitation data; and
   updating, by one or more processors, the sun exposure profile based, at least in part, on the identified current weather data.

6. The computer-implemented method of claim 1, wherein:
   the weather data includes historical sun patterns, historical cloud patterns, and historical inclement weather patterns; and
   the generating of the sun exposure profile includes predicting cloud coverage and available shade based, at least in part, on predicted sun patterns, predicted cloud patterns, and predicted inclement weather patterns.

7. The computer-implemented method of claim 1, wherein the dynamic seat selection further includes recommended times for the user to take breaks during the scheduled event, wherein the recommended times are based, at least in part, on the sun exposure profile.

8. The computer-implemented method of claim 1, the method further comprising:
   recommending, by one or more processors, one or more periods of time within a calendar year to attend events similar to the scheduled event based, at least in part, on the sun exposure profile.

9. A computer program product, the computer program product comprising:
   one or more computer-readable storage media and program instructions stored on the one or more computer-readable storage media, the stored program instructions comprising:
   program instructions to receive (i) weather data, (ii) venue data for a physical venue, and (iii) user preferences, the user preferences including preferred sun exposure information for a user;
   program instructions to generate a sun exposure profile for the physical venue, based, at least in part, on the weather data and the venue data;
   program instructions to generate a digital representation of the physical venue that provides an interactive layout of the physical venue, the digital representation including an overlay that illustrates predicted sun exposure levels for respective seats at the physical venue based, at least in part, on the generated sun exposure profile, and the predicted sun exposure levels including a predicted sun exposure level for a path between the physical venue and a vehicle of the user; and
   program instructions to provide a user with a dynamic seat selection for a scheduled event at the physical venue utilizing the generated digital representation, the dynamic seat selection indicating available seats that meet a threshold value of matching between a preferred sun exposure for the user and a predicted sun exposure for the scheduled event.

10. The computer program product of claim 9, the stored program product further comprising:
program instructions to generate the dynamic seat selection, wherein the dynamic seat selection includes: (i) a list of the available seats meeting the threshold value of matching, (ii) predicted temperature for each of the available seats throughout a defined time period for the scheduled event, and (iii) predicted sun exposure for each of the available seats throughout the defined time period for the scheduled event.

11. The computer program product of claim 10, wherein the digital representation of the physical venue includes: (i) size/architecture of the physical venue, (ii) a seating arrangement of the physical venue, (iii) a stadium orientation of the physical venue, (iv) historical temperature data of the physical venue, and (v) an identification of in-venue IoT sensor devices.

12. The computer program product of claim 11, wherein the overlay further illustrates predicted temperatures for respective seats at the physical venue.

13. The computer program product of claim 9, the stored program instructions further comprising:
program instructions to receive sensor data from an in-venue IoT system corresponding to the physical venue;
program instructions to analyze the sensor data to identify current weather data, wherein the current weather data includes temperature data and precipitation data; and
program instructions to update the sun exposure profile based, at least in part, on the identified current weather data.

14. The computer program product of claim 9, wherein:
the weather data includes historical sun patterns, historical cloud patterns, and historical inclement weather patterns; and
the generating of the sun exposure profile includes predicting cloud coverage and available shade based, at least in part, on predicted sun patterns, predicted cloud patterns, and predicted inclement weather patterns.

15. The computer program product of claim 9, wherein the dynamic seat selection further includes recommended times for the user to take breaks during the scheduled event, wherein the recommended times are based, at least in part, on the sun exposure profile.

16. The computer program product of claim 9, the stored program instructions further comprising:
program instructions to recommend one or more periods of time within a calendar year to attend events similar to the scheduled event based, at least in part, on the sun exposure profile.

17. A computer system, the computer system comprising:
one or more computer processors;
one or more computer readable storage media; and
program instructions stored on the one or more computer readable storage media for execution by at least one of the one or more processors, the stored program instructions comprising:
program instructions to receive (i) weather data, (ii) venue data for a physical venue, and (iii) user preferences, the user preferences including preferred sun exposure information for a user;
program instructions to generate a sun exposure profile for the physical venue, based, at least in part, on the weather data and the venue data;
program instructions to generate a digital representation of the physical venue that provides an interactive layout of the physical venue, the digital representation including an overlay that illustrates predicted sun exposure levels for respective seats at the physical venue based, at least in part, on the generated sun exposure profile, and the predicted sun exposure levels including a predicted sun exposure level for a path between the physical venue and a vehicle of the user; and
program instructions to provide a user with a dynamic seat selection for a scheduled event at the physical venue utilizing the generated digital representation, the dynamic seat selection indicating available seats that meet a threshold value of matching between a preferred sun exposure for the user and a predicted sun exposure for the scheduled event.

18. The computer system of claim 17, the stored program instructions further comprising:
program instructions to generate the dynamic seat selection, wherein the dynamic seat selection includes: (i) a list of the available seats meeting the threshold value of matching, (ii) predicted temperature for each of the available seats throughout a defined time period for the scheduled event, and (iii) predicted sun exposure for each of the available seats throughout the defined time period for the scheduled event.

19. The computer system of claim 18, wherein the digital representation of the physical venue includes: (i) size/architecture of the physical venue, (ii) a seating arrangement of the physical venue, (iii) a stadium orientation of the physical venue, (iv) historical temperature data of the physical venue, and (v) an identification of in-venue IoT sensor devices.

20. The computer system of claim 19, wherein the overlay further illustrates predicted temperatures for respective seats at the physical venue.

* * * * *